Patented Aug. 26, 1947

2,426,512

UNITED STATES PATENT OFFICE 2,426,512

PROTECTIVE COATINGS

Charles B. Large, Pasadena, Maurice J. Zucrow, Altadena, and Robert L. Hirsch, Glendale, Calif., assignors to Aerojet Engineering Corporation, Azusa, Calif., a corporation of Delaware No Drawing. Application October 28, 1944, Serial No. 560,914

12 Claims. (Cl. 260—735)

This invention relates to protective coatings and more particularly to protective coats adapted for spraying or brushing and capable of withstanding the action of corrosive fluids and strong oxidizing inorganic acids.

An object of our invention is to provide a protective coating capable of efficiently insulating metals, fabrics, wood and other porous surfaces against the action of strong oxidizing acids in any and all concentrations.

A related object is to provide a non-inflammable coating.

Another object is to provide a coating which will adhere tightly to the surfaces to which it is sprayed and is tough enough to resist ordinary wear.

According to our invention the lacquer mixture comprises a halogenated natural rubber, or other suitable halogenated rubber, plasticized with highly halogenated saturated hydrocarbon compounds having at least two carbon atoms and which are compatible with the halogenated natural or other rubber, and a highly halogenated saturated hydrocarbon liquid solvent having not more than twenty carbon atoms from which the dissolved plasticized natural rubber is deposited. By compatible halogenated compounds we mean such compounds which combine with or dissolve the halogenated rubber to form a liquid homogeneous phase. By a highly halogenated compound, either solvent or plasticizer, we mean one having at least 40% by weight of halogen in the molecule. The halogenated saturated hydrocarbons are intended to include the halogenated alkane and the halogenated cycloalkanes. The choice of the solvent is dependent upon the boiling point desired which in turn is subject to the type of drying desired and the manner in which the coating is to be applied to the surface.

The chlorinated rubber which we prefer to use in making the coating may vary between 100 and 1000 centipoise grade (100–1000 C. P. S.) of chlorinated natural rubber according to the degree of hardness required in the coating. Among the plasticizers which are compatible with the chlorinated natural rubber and which we prefer to use in compounding the coating are those which are highly chlorinated, such as chloropropane wax, or the unsaturated hexachlorobutadiene, and a so-called chloropropane liquid, which is composed of a mixture of hexachloropropane and heptachloropropane. The preferred chlorinated solvents for use in compounding the lacquer are the highly halogenated saturated hydrocarbons including carbon tetrachloride, chloroform, hexachloropropane, heptachloropropane, tetrachloroethane, and other similar highly halogenated saturated hydrocarbon liquids. When these substances are mixed in varying proportions it is possible to produce a series of lacquers having a wide range of properties which will render them suitable for many types of applications. These lacquers may be either brushed or sprayed depending on the volatility of the solvents used in compounding the mixture. The lacquers compounded with carbon tetrachloride are more suitable for brushing than spraying due to the low boiling point and high volatility of the carbon tetrachloride.

Where the mixture consists of chlorinated rubber, chloropropane wax, hexachlorobutadiene, and carbon tetrachloride, these substances may be employed in the following proportions:

| | Per cent by weight |
|---|---|
| Chlorinated rubber | 5 to 50 |
| Chloropropane wax (based on the weight of the chlorinated rubber) | .5 to 50 |
| Hexachlorobutadiene | .5 to 10 |
| Carbon tetrachloride | 30 to 95 |

In case it is desired to obtain different physical characteristics in the coating, commercial chloropropane liquid, consisting principally of a mixture of heptachloropropane and hexachloropropane, may be substituted in the amounts equivalent to those shown for hexachlorobutadiene in the above formula.

An example of a coating according to our invention is as follows:

| | Per cent by weight |
|---|---|
| Carbon tetrachloride | 90 |
| Hexachlorobutadiene | 0.8 |
| Chloropropane wax | 2.8 |
| Chlorinated rubber (1000 C. P. S. grade) | 6.4 |

Lacquers which are better suited for flat non-porous surfaces such as polished metal surfaces, may be compounded by decreasing the amount of carbon tetrachloride and adding in its place other chlorinated compounds such as chloropropane liquid comprising a mixture of compounds of propane having six and seven of the hydrogens replaced by chlorine, tetrachloroethane, and other chlorinated solvents, and by substituting other viscosity grades of chlorinated natural rubber or their mixtures for the 1000 C. P. S. grade.

While the example makes use of chlorinated compounds, it is not the intention of the inventors to limit themselves to the use of chlorinated compounds alone but to include other halogenated compounds which are suitable, such as the corresponding fluorides and which could be used to replace any or all of the chlorinated compounds given in the example.

An advantage of our invention is the use of this coating to protect light metals such as magnesium and aluminum from the corrosive effect of strong oxidizing acids. Materials having porous surfaces such as cloth, wood, and other porous substances may be sealed against the penetration of inorganic acids by the use of this layer and thereby render available for use in contact with inorganic acids substances which would otherwise be quickly decomposed by the action of the strong oxidizing acids.

Solutions from which the coatings are deposited are non-inflammable and may be handled in places where inflammability of ordinary lacquers would prevent their use. It has been found that any residual traces of solvent retained by the dry film coating show no deleterious effect in the resistance of the coating against strong inorganic acids.

It has been found that our coating is capable of adhering closely and bonding tightly on the base material on which it is sprayed. This coating may be either sprayed or brushed on as circumstances require.

It was also found possible to incorporate in the coating inert pigments such as titanium dioxide, aluminum powders, aluminum oxide, and other inert pigments without affecting materially the properties of the lacquer.

Lacquers of the type set forth in the example may be advantageously used to provide a fireproof covering on material that would burn readily if ignited such as paper, cloth and wood.

We claim:

1. A lacquer comprising 1000 C. P. S. grade chlorinated natural rubber 6.4% by weight, chloropropane wax 2.8% by weight, hexachlorobutadiene .8% by weight, carbon tetrachloride 90% by weight.

2. A lacquer comprising chlorinated natural rubber, chloropropane wax, and hexachlorobutadiene, said hexachlorobutadiene being present in an amount which lies between .5% to 10% by weight based on the total ingredients, the chloropropane wax and hexachlorobutadiene combined being present in such proportion to plasticize the chlorinated rubber, and sufficient carbon tetrachloride to make the plasticized chlorinated natural rubber fluid.

3. A lacquer according to claim 2 in which the chlorinated natural rubber is 100 to 1000 C. P. S. grade chlorinated natural rubber.

4. A lacquer according to claim 2 in which the chlorinated natural rubber is 1000 C. P. S. grade chlorinated natural rubber.

5. A lacquer comprising 5% to 50% by weight of 1000 C. P. S. grade chlorinated rubber, chloropropane wax in the proportion of .5% to 50% by weight of the chlorinated natural rubber used, .5% to 10% by weight of hexachlorobutadiene, and 30% to 95% by weight of carbon tetrachloride.

6. A lacquer comprising 5% to 50% by weight of 1000 C. P. S. grade chlorinated rubber, chloropropane wax in the proportion of .5% to 50% by weight of the chlorinated natural rubber used, .5% to 10% by weight of a material taken from the group consisting of hexachloropropane and heptachloropropane, and 30% to 95% by weight of carbon tetrachloride.

7. A lacquer comprising 5% to 50% by weight of 100 to 1000 C. P. S. grade chlorinated rubber, chloropropane wax in the proportion of .5% to 50% by weight of the chlorinated natural rubber used, .5% to 10% by weight of hexachlorobutadiene, and 30% to 95% by weight of carbon tetrachloride.

8. A lacquer comprising 5% to 50% by weight of 100 to 1000 C. P. S. grade chlorinated rubber, chloropropane wax in the proportion of .5% to 50% by weight of the chlorinated natural rubber used, .5% to 10% by weight of hexachlorobutadiene, and 30% to 95% by weight of a mixture of chloropropane liquid selected from the group consisting of hexachloropropane and heptachloropropane and carbon tetrachloride.

9. A lacquer comprising 5% to 50% by weight of 100 to 1000 C. P. S. grade chlorinated rubber, chloropropane wax in the proportion of .5% to 50% by weight of the chlorinated natural rubber used, .5% to 10% by weight of hexachlorobutadiene, and 30% to 95% by weight of chloropropane liquid selected from the group consisting of hexachloropropane and heptachloropropane.

10. A lacquer comprising chlorinated natural rubber, chloropropane wax, and hexachlorobutadiene, said hexachlorobutadiene being present in an amount which lies between .5% and 10% by weight based on the total ingredients, the chloropropane wax and hexachlorobutadiene combined being present in such proportion to plasticize the chlorinated rubber, .5% to 10% by weight based on the total ingredients of a chloropropane liquid consisting of a mixture of hexachloropropane and heptachloropropane and sufficient carbon tetrachloride to make the plasticized chlorinated natural rubber fluid.

11. A lacquer comprising chlorinated natural rubber, chloropropane wax, and hexachlorobutadiene, said hexachlorobutadiene being present in an amount which lies between .5% and 10% by weight based on the total ingredients, the chloropropane wax and hexachlorobutadiene combined being present in such proportion to plasticize the chlorinated rubber, and sufficient solvent to make the plasticized chlorinated natural rubber fluid, said solvent being selected from the class of compounds consisting of carbon tetrachloride, chloroform, hexachloropropane, heptachloropropane, and tetrachloroethane.

12. A lacquer comprising 5% to 50% by weight of 1000 C. P. S. grade chlorinated rubber, chloropropane wax in the proportion of .5% to 50% by weight of the chlorinated natural rubber used, .5% to 10% by weight of hexachlorobutadiene, and 30% to 95% by weight of a solvent selected from the class of compounds consisting of carbon tetrachloride, chloroform, hexachloropropane, heptachloropropane and tetrachloroethane.

CHARLES B. LARGE.
MAURICE J. ZUCROW.
ROBERT L. HIRSCH.

REFERENCES CITED

The following references are of record in the file of this patent:

UNITED STATES PATENTS

| Number | Name | Date |
|---|---|---|
| 1,527,715 | Thieme | Feb. 24, 1925 |
| 2,057,999 | Bowlby | Oct. 20, 1936 |
| 2,079,756 | Bowlby | May 11, 1937 |
| 2,194,690 | Clayton et al. | Mar. 26, 1940 |